United States Patent [19]
Burke

[11] 3,795,053
[45] Mar. 5, 1974

[54] COMBINATION DRAFTING INSTRUMENT
[76] Inventor: Dennis A. Burke, 3104 N.E. 48th Ave., Portland, Oreg. 97213
[22] Filed: Mar. 10, 1972
[21] Appl. No.: 233,652

[52] U.S. Cl.................. 33/1 B, 33/27 C, 33/174 B, 33/189
[51] Int. Cl............................................. B43l 13/00
[58] Field of Search... 33/1 N, 104, 174 B, 27 C, 189, 33/1 B

[56] References Cited
UNITED STATES PATENTS

| 555,287 | 2/1896 | Horrigan | 33/174 B X |
| 2,476,338 | 7/1949 | Vitez | 33/1 N |
| 2,003,172 | 5/1935 | Burt | 33/1 N |
| 1,301,092 | 4/1919 | Berhard | 33/104 |
| 886,695 | 5/1908 | Grenier | 33/1 N |
| 3,208,153 | 9/1965 | Magiera | 33/189 |

Primary Examiner—William D. Martin, Jr.
Attorney, Agent, or Firm—Klarquist, Sparkman, Campbell, Leigh, Hall & Whinston

[57] ABSTRACT

A one-piece combination drafting instrument combines features of a protractor, compass, ruler and triangle. The instrument comprises a thin, flat, circular, transparent disc with its peripheral edge subdivided into degrees by radial degree marking lines, degree marking holes at 5° intervals just inwardly of the peripheral edge and degree indicia at 10° intervals. The disc is subdivided into 45° segments by straight rows of guide holes radiating from a center guide hole along various diameters of the disc. A primary pair of such diameters, extending perpendicular to one another, is subdivided into units of length by dimension marking lines. At least some of such lines extend through the guide holes along such diameters. Some of these marking lines are also identified by dimensional indicia which proceed progressively outwardly in increasing order from a zero reference point at the center guide hole. Pairs of sight guide lines extend at right angles to one another from the guide holes provided along a secondary pair of diameters spaced 45° from the primary diameters. The sight guide lines are aligned with the lineal dimension marking lines and guide holes along the primary diameters. The sight guide lines together define a series of concentric squares symmetrical about the center guide hole.

6 Claims, 2 Drawing Figures

PATENTED MAR 5 1974  3,795,053

COMBINATION DRAFTING INSTRUMENT

BACKGROUND OF THE INVENTION

1. Field of the Invention

The present invention relates to combination drafting instruments.

2. Description of the Prior Art

Although various combination-type drafting instruments have been proposed for combining two or more drafting functions commonly performed by separate conventional drafting instruments such as rulers, protractors, compasses, triangles and the like, no known instrument of this type combines the great versatility and precision of the instrument of the present invention with its inherent simplicity.

SUMMARY OF THE INVENTION

The present invention is a thin, flat, circular, transparent disc, the peripheral edge of which throughout 360° is provided with degree-marking lines at small intervals, guide holes just inwardly of the edge at somewhat larger intervals, and degree indicia progressively at least at 10° intervals. The disc also has a center guide hole and is subdivided into 45° segments by a series of straight rows of guide holes radiating from the center guide hole along a pair of primary diameters and a pair of secondary diameters of the disc. The rows of guide holes extending along the two primary diameters include lineal dimension marking lines subdividing the diameters into small units of length. Some of such lines may extend through the guide holes and include lineal dimension indicia to provide a length measuring means.

The guide holes along the secondary diameters include pairs of sight guide lines with each line of a pair extending at right angles to the other line of the pair and in alignment with a lineal dimension marking line along one of the primary diameters. These sight guide lines together define a series of concentric squares symmetrical about the center guide hole of the disc and provide ready means whereby the centers of circles of various diameters and other shapes can be readily found, and whereby squares, rectangles, octagons and triangles of various dimensions may be readily and speedily constructed.

Examples of some of the operations that can be performed using the illustrated drafting instrument of the invention, with the aid of at most only a straight edge and one or two pencils, include:

1. finding the centers of circles of various diameters;
2. directly measuring the radius, diameter, chords and other dimensions of circles of various diameter and the dimensions of other shapes and lines;
3. directly measuring and marking angles and arcs of a circle with precision up to one-half a degree;
4. measuring or marking degrees of an arc or circle or angles with great speed and with precision up to 5°;
5. constructing circles of various diameters and concentric circles;
6. constructing squares and concentric squares;
7. constructing rectangles and concentric rectangles;
8. constructing octagons and concentric octagons;
9. constructing triangles of various sizes and shapes and concentric triangles;
10. constructing parallelograms, trapeziods and various other geometrical figures;
11. constructing angles of any degree;
12. constructing parallel, horizontal and vertical lines and lettering guidelines;
13. constructing approximate ellipses; and
14. constructing complete diagrams, drawings and designs.

The foregoing and other objects, features and advantages of the present invention will become more apparent from the following detailed description which proceeds with reference to the accompanying drawings.

DETAILED DESCRIPTION

Figure 1:
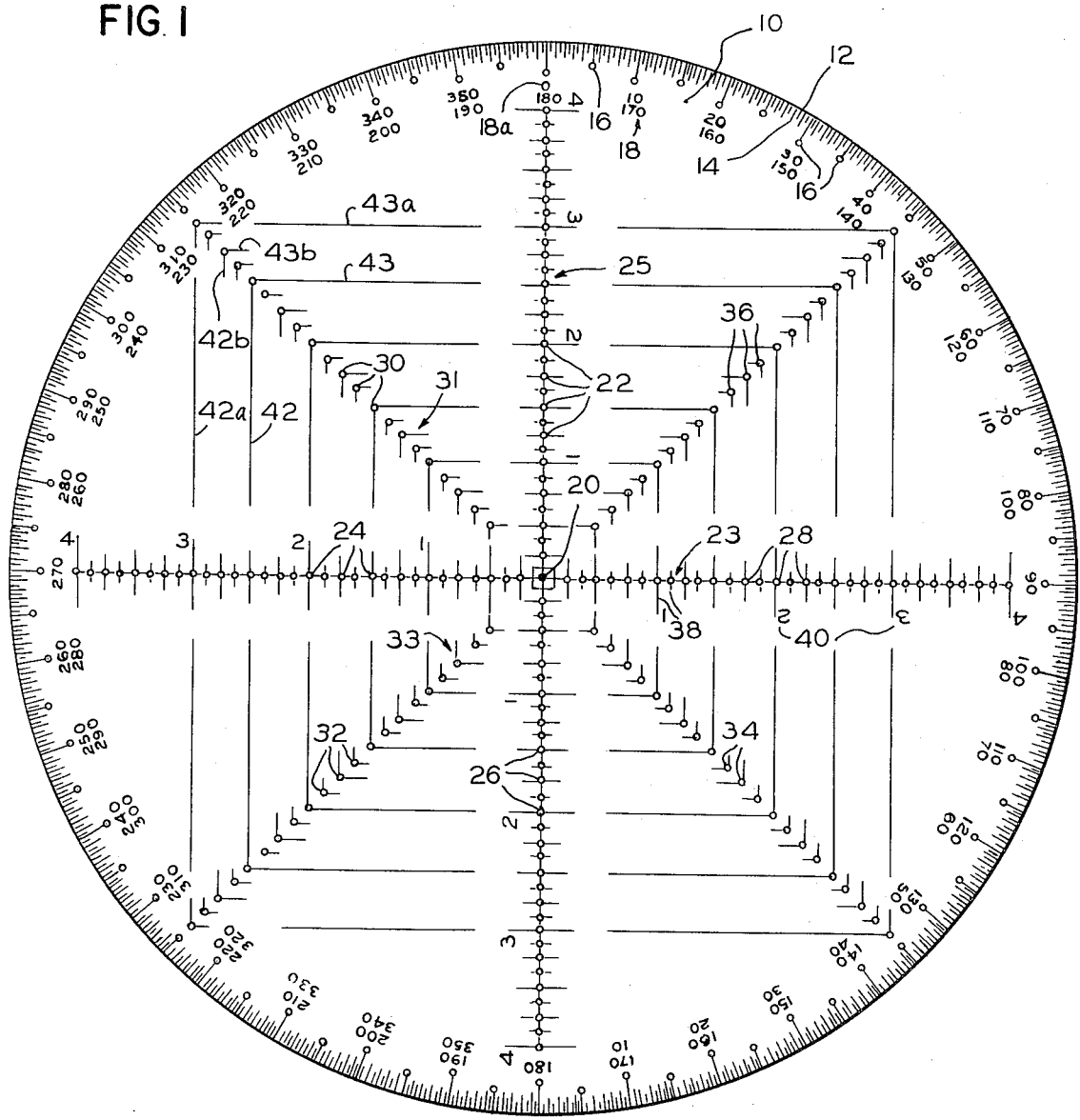
FIG. 1 is a top plan view of a drafting instrument in accordance with the invention.

With reference to the drawings, a drafting instrument in accordance with the invention includes a thin, flat, circular, transparent, plastic disc 10 having a peripheral edge 12 subdivided at one-half degree intervals by radial degree marking lines 14. At 5° intervals, the marking lines terminate at their inner ends at guide holes 16 extending through the disc inwardly of the peripheral edge. At 10° intervals the marking lines 14 are identified by degree indicia 18 proceeding from a zero reference indicia 18a preferably in both directions circumferentially of the disc throughout 360°. Thus the degrees of an arc or a circle can be marked off or measured with precision up to one-half degree along the peripheral edge of the disc. On the other hand, the degrees of an angle, arc or circle can be laid out very rapidly at 5° intervals using the degree guide holes 16 and by inserting a pencil point through the guide hole with the center of the disc positioned at the vortex of the angle or at the center of the circle or arc being measured or constructed.

The exact center of the disc is provided with a center guide hole 20. From this center guide hole a first set of straight radial rows of guide holes 22, 24, 26 and 28 radiate along a first pair of primary diameters 23, 25 of the disc, terminating adjacent the peripheral edge thereof. The two primary diameters along which the rows of guide holes 22, 24, 26, 28 extend intersect at right angles to divide the disc into 90° segments.

Extending perpendicular to one another at a 45° spacing from the primary diameters is a pair of secondary diameters 31, 33 along which a second series of straight rows of guide holes 30, 32, 34, 36 extend to subdivide the disc into 45° segments.

Both the first and second sets of rows of guide holes subdivide their respective diameters into units of length or lineal dimension. The rows of guide holes 22, 24, 26, 28 are provided in the illustration at one-quarter inch intervals along their primary diameters. The rows of guide holes 30, 32, 34 and 36 are provided at one-eighth inch intervals along their secondary diameters.

The primary diameters containing the rows of guide holes 22, 24, 26, 28 are further subdivided into even smaller units of length by lineal marking lines 38 which in the illustration are provided at one-eighth inch intervals. Thus every other marking line along one of these diameters extends through one of the guide holes 22, 24, 26 or 28. Some of the length marking lines are identified by lineal dimension indicia 40. In the illustrated disc these indicia are numbers provided at one-inch intervals progressing outwardly from the center hole 20 in opposite directions along the four rows 22, 24, 26, 28, with the center guide hole thus serving as a zero reference point for all four rows.

Although the rows of guide holes 22, 24, 26, 28 are provided at the one-quarter inch marks along both primary diameters, if desired such guide holes could be provided at, for example, the one-eighth inch marks along one primary diameter and at the one-quarter inch marks along the other primary diameter, thereby enabling the ready marking off of lengths with precision up to one-eighth of an inch rather than to one-quarter inch as required by the illustrated disc. Of course, the rows of guide holes could be provided at one-eighth inch intervals along both primary diameters, if desired, or the diameters could be subdivided by lineal marking lines into one-sixteenth inch units with guide holes along one diameter being at the one-sixteenth inch marks and with the holes along the other diameter being at the one-eighth inch marks, thereby enabling the marking off of lengths with one-sixteenth inch precision. However, care must be taken not to space the guide holes at too close intervals so as not to overly weaken the disc and thereby unduly increase the probability of breakage of the disc if it should be dropped or struck sharply.

Pairs of sight guide lines 42, 43 extend outwardly at right angles to one another from the secondary diameters containing rows 30, 32, 34 and 36. Such sight guide lines are aligned with lineal marking lines 38 along the primary diameters. In the illustrated disc the sight guide lines extend outwardly from each guide hole in the rows 30, 32, 34 and 36, with some of the sight guide lines such as lines 42a, 43a at certain intervals along the rows being longer than others of the sight guidelines such as lines 42b, 43b at other intervals along the rows. In the illustrated disc the long sight guidelines are provided at one-half inch intervals along the secondary diameters whereas at least short sight guidelines are provided at every guide hole, that is, at one-eighth inch intervals.

Taken together, all of the pairs of sight guidelines define a series of concentric squares which are symmetrical about the center hole 20 of the disc. These concentric squares are of great aid in quickly finding the center of any circle on a drawing without taking any measurements or making any construction lines. As will be readily appreciated by those in the drafting field, such sight guidelines are also of great aid in constructing various geometrical figures such as squares, rectangles, triangles and so forth.

Preferably the degree marking lines 14 and the lineal dimension marking lines 38 and sight guidelines 42, 43 are inscribed in the upper surface of the disc for permanence, although, of course, it would be possible also merely to print the lines on the disc.

Figure 2:
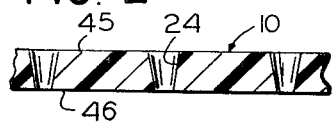
FIG. 2 is a fragmentary cross-sectional view through a portion of the instrument of FIG. 1 on an enlarged scale taken along one of the diameters containing a row of guide holes.

All of the guide holes including the degree guide holes and the center guide hole in the various rows of guide holes are all constructed as shown in FIG. 2 so as to be of sufficient size to receive the point of a pencil. The holes taper inwardly from a relatively wide opening at the upper surface 45 of the disc to a smaller opening at the lower surface 46 of the disc.

USE OF THE DISC

Draftsmen will immediately recognize the versatility of the drafting instrument described. Examples of the use of the instrument are as follows:

FINDING THE CENTERS OF CIRCLES

To find the center of a circle, the disc is placed over the circle and then the sight guidelines 42, 43 and lineal dimension lines 38 are used to line up the circumference of the circle until it is tangent to all sides of one of the concentric squares defined by the guidelines, or alternatively until the circumference of the circle passes through corresponding guide holes in all four rows of holes along one of the two pairs of diameters. With the disc thus aligned, the draftsman simply places a pencil point through the center hole 20 of the disc to mark the center point of the circle.

MEASURING AND MARKING THE DIMENSIONS OF A CIRCLE OR OTHER GEOMETRIC FORMS

A lineal dimension of a circle, such as a radius, diameter or chord, can be measured directly simply by placing the disc over the circle with one of the primary diameters of the disc along the line to be measured and with the zero point 20 of the disc at one end of the line. With the disc thus positioned, the dimension of the line can be read directly on the instrument. The length of any line can be determined in this manner.

If a certain dimension is to be marked along a radius, diameter or chord of a circle, or along any other line, one of the diameters of the disc is placed along the line to be marked with the center point at one end of the line. A pencil point is placed through the guide hole along the disc diameter corresponding to the desired length to be marked off to mark such length.

If a drawing contains concentric circles, as in the case of a drawing of a pipe cross section, both the inner and outer radii or diameters of the pipe can be measured directly using the same technique.

USE AS A PROTRACTOR

The instrument can be used as a protractor to measure or mark off selected degrees of a circle or an arc of a circle or any angle. The center hole 20 of the disc is placed over the center of the circle or arc or at the vertex of any angle. Then the arc or angle can be measured or marked off to the nearest one-half degree if need be, along the peripheral edge of the disc. Guide lines may have to be drawn to extend radial lines of an arc to be measured or at least one leg of an angle out beyond the periphery of the disc to obtain the measurement. Where accuracy to the fifth degree only is required, the disc can be used as a speed protractor using the degree guide holes 16 to measure or mark off the degrees.

CONSTRUCTING CIRCLES AND CONCENTRIC CIRCLES

The disc can be used as a speed compass to construct circles of any radius up to the maximum diameter of the disc. First the center point of the circle is established using the center hole of the disc 20, and the disc is positioned for rotation about the established center point by projecting a pencil point or other sharp-pointed device through the center hole 20 to hold the disc in place. Then the desired radius of the circle is measured off along one of the primary diameters defined by the rows of guide holes 22, 24, 26 and 28 and then the point of another pencil is projected through the guide hole corresponding to the radius desired and the disc is spun about its center to draw the circle. Concentric circles are constructed by marking off the desired multiple radii of the concentric circles along one of the principal diameters using the guide holes 22, 24, 26, 28 and then spinning the disc with a pencil point successively through the guide holes corresponding to the radii marked.

CONSTRUCTING SQUARES

Squares and concentric squares can be readily constructed using either the four perpendicular rows of guide holes 30, 32, 34 and 36 and their associated guide lines to establish the corner points of the square or squares and then connecting the corner points using a straight edge. Alternatively, squares of specified dimensions can be constructed by establishing one corner point at the center of the disc and then marking off two other corner points along the two primary diameters 23, 25. By connecting the three points, two sides of the square are established. The fourth corner point is established by placing the center of the disc at the second or third corner point with one of the primary diameters extending along one of the established sides. With the disc thus positioned the fourth corner point is measured off and marked along the other primary diameter.

With the illustrated disc, a square having sides up to four inches in length can be constructed. However, larger squares or rectangles can be built up from a series of 4-inch or smaller squares.

Concentric squares can be constructed easily using the concentric guide lines 42, 43 of the disc and their corresponding rows of guide holes 30, 32, 34 and 36, to establish the corner points of the concentric squares and then using a straight edge and pencil to connect the corner points thus established.

CONSTRUCTING RECTANGLES

Rectangles of various dimensions can be constructed easily using a combination of one of the primary diameters and two of the diagonal rows of guide holes such as the rows 32 and 34, with the aid of the sight guidelines. For example, the length of two opposing sides of the rectangle can be measured off and marked along a primary diameter, such as diameter 23. Points establishing the other pair of opposed sides of the rectangle can be marked off along the diagonal rows 30, 36, using the sight guide lines to help establish these two additional points. The two points established along the primary diameter are connected up to form one side of the rectangle. These two points in turn are connected up with the points established along the two diagonal rows 30, 36 to establish two opposing lines which contain the other two sides of the rectangle. Then the other two sides are simply measured off and marked along these two lines to establish the length of such sides. Finally the fourth side is formed by connecting the outer end points of the other two sides.

CONSTRUCTING OCTAGONS

An octagon can be constructed using the disc first by establishing a center point for the octagon using the center of the disc. With the center of the disc remaining at the center of the octagon, the eight radii of the octagon are measured off and marked along the eight rows of guide holes 24, 32, 26, 34, 28, 36, 22 and 30. With the outer extremities of the eight diameters of the octagon thus established, these points are simply connected together using a straight edge to form the octagon. Concentric octagons would be constructed in the same manner using radii of different lengths but a common center point.

CONSTRUCTING TRIANGLES

Triangles of various sizes and shapes can be constructed using the disc, a straight edge and a pencil. First, a base line to form one side of the triangle is established by laying out the desired length of such base line along one of the primary diameters. Then with the center hole of the disc over one end point of the base line, one angle of the triangle can be laid out and marked using the disc as a protractor. Then by shifting the center hole of the disc to the opposite end point of the base line, a second angle of the triangle can be laid out, again using the disc as a protractor. Then the end points of the base line are connected to the two marked points establishing the two angles of the triangle to form the second and third sides of the triangle. The third angle of the triangle is established at the intersection of the second and third sides of the triangle.

From the foregoing description of the use of the disc in constructing various basic shapes, it will readily occur to those skilled in the art how the disc can be used to construct other geometric shapes, such as parallelograms and trapezoids. Various angles and parallel lines, whether vertical, horizontal or oblique, lettering guide lines and other lines can easily be constructed using the techniques described.

From the foregoing it will also be apparent that the disc, as shown, when used alone or with a pencil and straight edge, has great utility. However, if desired, the disc described could be rotatably mounted within a circular opening of a base member having a base surface flush with the base surface of the disc and with the base member provided with a straight edge. The utility of such a device would be that it would incorporate the straight edge required to construct lines and require only one pencil to construct circles.

Having illustrated and described what is presently a preferred embodiment of my invention, it should be apparent to those skilled in the art that the same permits of modification in arrangement and detail. I claim as my invention all such modifications as come within the true spirit and scope of the following claims.

I claim:

1. A drafting instrument comprising:
   a thin, flat, circular, transparent disc having a peripheral edge,
   the periphery of said disc being subdivided into degrees by radial degree marking lines throughout 360°,
   at least some of said degree marking lines at regular intervals including pencil-receiving guide holes extending through said disc inwardly of said peripheral edge,
   at least some of said degree marking lines including progressive degree indicia,
   said disc having a center through guide hole,
   said disc being subdivided into 90° segments by a first set of straight radial rows of through guide holes extending outwardly from said center guide hole to a peripheral portion of said disc at intervals along a pair of primary diameters of said disc to subdivide said diameters into lineal units of measure, said first pair of diameters including lineal dimension marking lines therealong perpendicular to said diameters and subdividing said diameters into lineal units of measure, at least some of said guide holes of said primary diameters extending through said lineal dimension marking lines, at least some of said dimension marking lines along both of said first pair of diameters being identified by progressive lineal dimension indicia comprising numbers increasing progressively in value radially outwardly from said center guide hole in opposite directions along said primary diameters so that said center hole provides a zero reference point, said disc being subdivided into 45° segments by a second set of straight radial rows of through guide holes extending outwardly from said center guide hole to a peripheral portion of said disc at intervals along a pair of secondary diameters spaced at 45° from said primary diameters, to subdivide said seconday diameters into lineal units of measure, and a plurality of pairs of sight guide lines extending from guide holes of said secondary diameters toward said primary diameters with each guide line of each pair being perpendicular to the other guide line of said pair and perpendicular to the primary diameter toward which it extends and with said sight guide lines being aligned with said lineal dimension marking lines of said primary diameters, said pairs of sight guide lines of one said secondary diameter being aligned with said pairs of sight guide lines of the other said secondary diameter so that said pairs of sight guide lines collectively define a series of concentric squares symmetrical about said center guide hole.

2. A device according to claim 1 wherein at least some of said sight guide lines of said second rows of guide holes and are in alignment with said guide holes of said first rows of guide holes.

3. A device according to claim 1 wherein said numbers are provided at said lineal dimension lines identifying at least some of said guide holes along said primary diameters.

4. A device according to claim 1 wherein said guide holes along one diameter of said primary diameters are provided at the same dimensional intervals with respect to said center opening as the guide holes along the second diameter of said primary diameters.

5. A device according to claim 4 wherein said guide holes along said primary diameters are aligned with sight guide lines and guide holes along said secondary diameters.

6. A device according to claim 1 wherein said peripheral edge of said disc is subdivided by said degree marking lines into one-half degree units and is subdivided by said guide holes inwardly of said peripheral edge into 5° units and said degree indicia are provided at 10° intervals.

* * * * *